United States Patent
Perry et al.

(10) Patent No.: US 8,690,176 B2
(45) Date of Patent: Apr. 8, 2014

(54) SUSPENSION ARM/LINK FOR MOTOR VEHICLE AND METHOD FOR MAKING SAME

(75) Inventors: William R. Perry, Shelby Township, MI (US); Julie Schoenherr, Washington Township, MI (US)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 13/257,183

(22) PCT Filed: Mar. 12, 2010

(86) PCT No.: PCT/CA2010/000367
§ 371 (c)(1),
(2), (4) Date: Oct. 13, 2011

(87) PCT Pub. No.: WO2010/105340
PCT Pub. Date: Sep. 23, 2010

(65) Prior Publication Data
US 2012/0021241 A1  Jan. 26, 2012

Related U.S. Application Data

(60) Provisional application No. 61/161,923, filed on Mar. 20, 2009.

(51) Int. Cl.
*B60G 3/04* (2006.01)
*B60G 7/00* (2006.01)
*B60G 3/06* (2006.01)

(52) U.S. Cl.
CPC *B60G 7/001* (2013.01); *B60G 3/04* (2013.01); *B60G 3/06* (2013.01)
USPC .............................. 280/124.134; 280/124.143

(58) Field of Classification Search
USPC ................... 280/124.134, 124.135, 124.136, 280/124.14, 124.143; 29/897.2, 428
See application file for complete search history.

(56) References Cited

U.S. PATENT DOCUMENTS 1,380,659 A  *  6/1921  Layman ........................ 74/559
3,909,919 A     10/1975  Miyabayashi et al.
(Continued)

FOREIGN PATENT DOCUMENTS

CA  2141289 A1  8/1995
CA  2611281 A1  5/2009
(Continued)

OTHER PUBLICATIONS

Werner Koenig, Radius arm for a wheel suspension of motor vehicles, Oct. 14, 1982, EPO, DE 3109565 A1, Machine Translation of Description.*

*Primary Examiner* — James English
(74) *Attorney, Agent, or Firm* — Dickinson Wright PLLC

(57) ABSTRACT

A vehicle suspension component includes a first metal sheet having a center portion bounded by a first outer wall and a second outer wall. A second metal sheet includes a center portion in engagement with the center portion of the first sheet. The second sheet includes a first downturned wall engaging a surface of the first outer wall as well as a second downturned wall engaging a surface of the second outer wall. One of the first and second sheets includes a first hemmed flange portion wrapping around a first edge of the other of the first and second sheets and engaging another surface of the other first and second sheet. One of the first and second sheets includes a second hemmed flange portion wrapping around a second edge of the other of the first and second sheets and engaging another surface of the first and second sheets.

8 Claims, 5 Drawing Sheets

(56) References Cited

U.S. PATENT DOCUMENTS

| | | | | |
|---|---|---|---|---|
| 5,362,090 A | * | 11/1994 | Takeuchi | 280/124.152 |
| 5,470,416 A | * | 11/1995 | Herring et al. | 156/196 |
| 5,695,213 A | * | 12/1997 | Nakamura et al. | 280/124.134 |
| 5,992,867 A | * | 11/1999 | Kato et al. | 280/124.134 |
| 7,654,544 B2 | * | 2/2010 | Lounsberry et al. | 280/124.134 |
| 7,703,783 B2 | * | 4/2010 | Miyawaki | 280/124.134 |
| 7,722,280 B2 | * | 5/2010 | Hofmann | 403/266 |
| 8,025,301 B2 | * | 9/2011 | Guttilla et al. | 280/124.134 |
| 2005/0104315 A1 | * | 5/2005 | Howell et al. | 280/124.134 |
| 2005/0184481 A1 | * | 8/2005 | Tanaka et al. | 280/124.134 |
| 2007/0096420 A1 | * | 5/2007 | Lounsberry et al. | 280/124.134 |
| 2008/0007125 A1 | * | 1/2008 | Koyama et al. | 310/27 |
| 2009/0072506 A1 | * | 3/2009 | Jang et al. | 280/124.134 |
| 2010/0084834 A1 | * | 4/2010 | Ersoy et al. | 280/124.1 |
| 2011/0298192 A1 | * | 12/2011 | Yu et al. | 280/124.134 |

FOREIGN PATENT DOCUMENTS

| | | |
|---|---|---|
| DE | 3109565 A1 | 10/1982 |
| EP | 0987166 A1 | 3/2000 |
| WO | WO 2008119342 A1 * | 10/2008 |

* cited by examiner

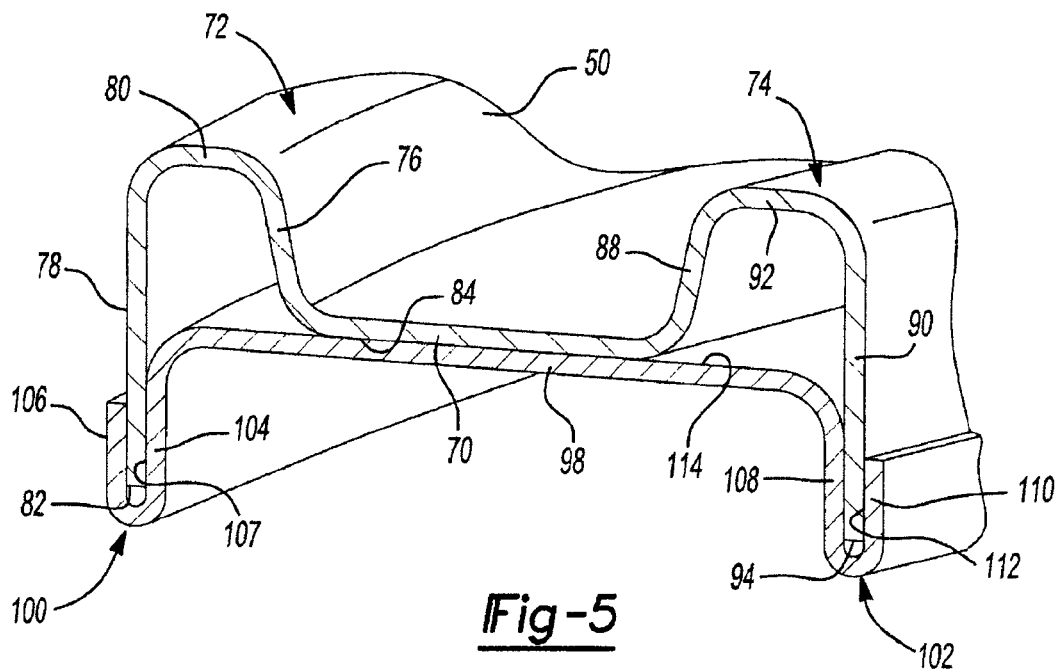
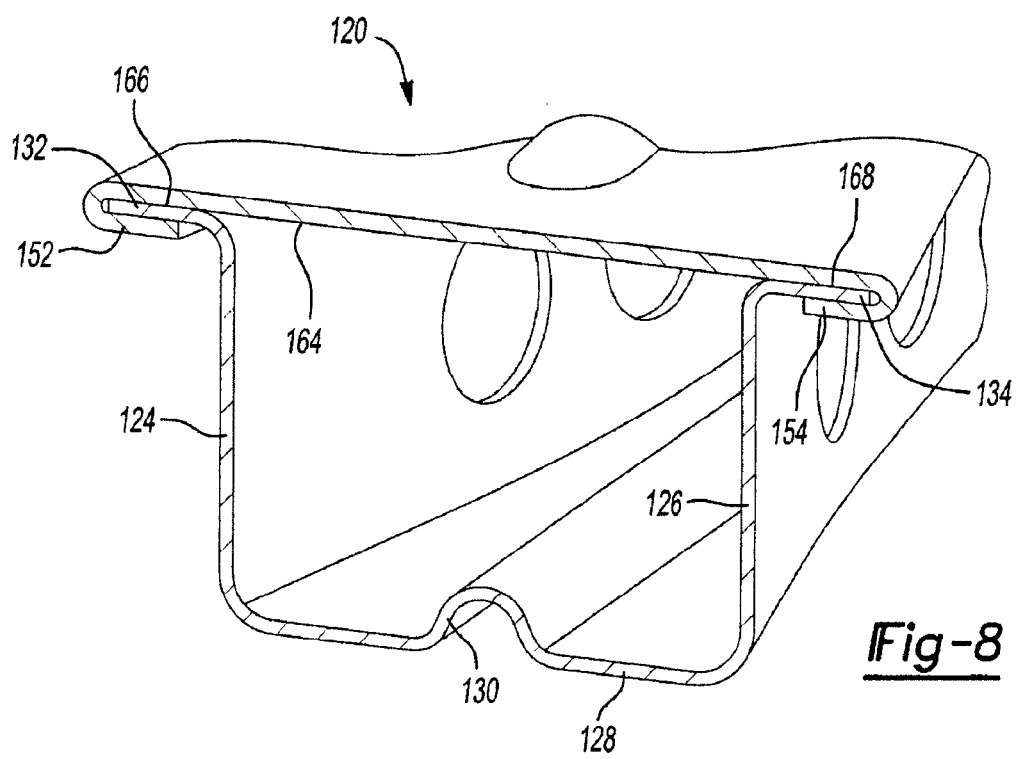

SUSPENSION ARM/LINK FOR MOTOR VEHICLE AND METHOD FOR MAKING SAME

CROSS-REFERENCE TO RELATED APPLICATIONS

This patent application claims the benefit of International Application No. PCT/CA2010/000367 filed Mar. 12, 2010 entitled "Suspension Arm/Link For Motor Vehicle And Method For Making Same" and U.S. Provisional Application Ser. No. 61/161,923 filed Mar. 20, 2009, the entire disclosures of the applications being considered part of the disclosure of this application, and hereby incorporated by reference.

FIELD OF THE INVENTION

The present disclosure relates to a suspension member for a motor vehicle including a first sheet metal stamped component mechanically fixed to a second sheet metal stamped component. The first and second sheet metal components may be constructed as having constant or variable thickness. The mechanical fixing process may include a number of methods such as hemming, mechanical locking, welding or any number of mechanical interconnection processes. A structural adhesive may be used to increase the structural integrity of the assembly and possibly reduce the thickness of one or more of the sheet metal stampings within the suspension member. A method for making the suspension member is also disclosed.

BACKGROUND OF THE INVENTION

In the past, some vehicle suspension members included a relatively complex body formed by a casting or a forging process. While these components typically functioned as desired, the costs associated with creating these components were relatively high.

Other known suspension members include first and second stamped sheets interconnected to one another. These designs may have accomplished the goal of creating a lower cost suspension member but concerns relating to structural behavior exist. For example, some known suspension arms are formed by welding several portions of the stampings to one another. Distortion due to the heat input during the welding process imposes challenges when attempting to achieve component dimensional repeatability. Furthermore, existing designs may not configure the suspension component to minimize weight while maximizing stiffness and buckling parameters.

Typically, the thickness of the first and second metal sheets is based on the suspension member geometry as well as the mechanical interconnection method used to couple the first and second metal sheets. Opportunities may exist to optimize the geometry and vary the interconnection method to reduce the gauge of the metal sheets to further lower component cost and weight. Accordingly, a need in the art exists for a structurally robust, low cost suspension member.

SUMMARY OF THE INVENTION

This section provides a general summary of the disclosure, and is not a comprehensive disclosure of its full scope or all of its features.

A vehicle suspension component includes a first metal sheet having a substantially planar center portion bounded by a first channel portion having a first outer wall and a second channel portion having a second outer wall. A second metal sheet includes a center portion in engagement with the center portion of the first sheet. The second sheet includes a first downturned wall engaging a surface of the first outer wall as well as a second downturned wall engaging a surface of the second outer wall. One of the first and second sheets includes a first hemmed flange portion wrapping around a first edge of the other of the first and second sheets and engaging another surface of the other first and second sheet. One of the first and second sheets includes a second hemmed flange portion wrapping around a second edge of the other of the first and second sheets and engaging another surface of the first and second sheets.

Furthermore, a suspension member for a vehicle includes a first stamping having a C-shaped cross section with first and second spaced apart side walls being interconnected by an end wall. The first stamping also includes a first flange outwardly extending from the first wall and a second flange outwardly extending from the second wall. A second stamping includes first and second opposite surfaces. The first surface is engaged with opposite surfaces of the first flange and the second flange.

A method of forming a suspension member includes stamping a first metal sheet to define a center portion and side walls extending substantially perpendicular to the center portion. A second metal sheet is stamped and positioned to overlap the sidewalls of the first metal sheet. The first and second sheets are mechanically interconnected along the overlapped portion.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 5 is a fragmentary cross-sectional perspective view of the front lower control arm depicted in FIG. 3;

FIG. 8 is a fragmentary cross-sectional view of the rear lower control arm depicted in FIG. 6;

Corresponding reference numerals indicate corresponding parts throughout the several views of the drawings.

DETAILED DESCRIPTION OF THE INVENTION

Example embodiments will now be described more fully with reference to the accompanying drawings.

Figure 1:
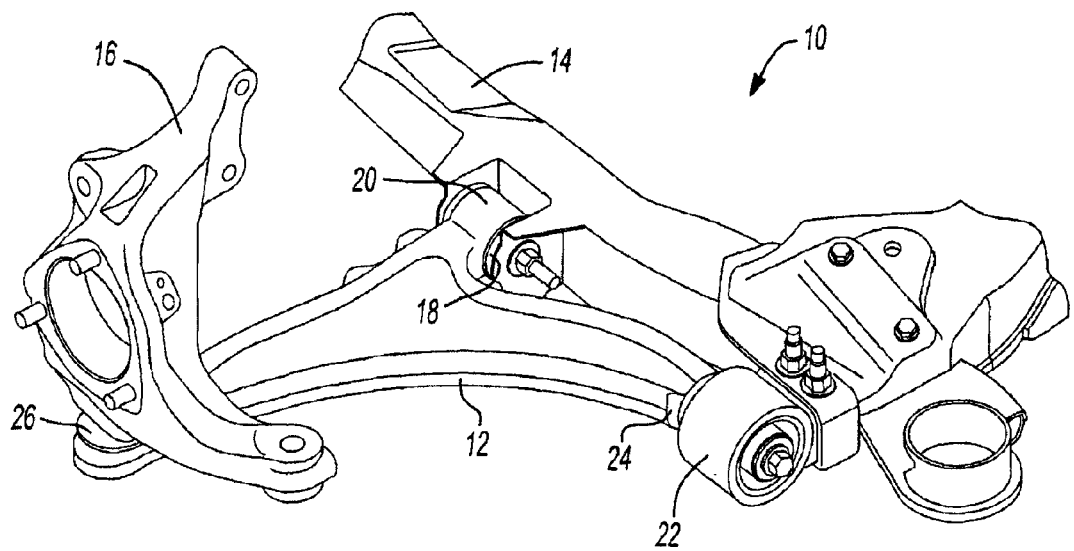
FIG. 1 is a fragmentary exploded perspective view depicting a front lower control arm and other portions of a vehicle front suspension.

FIG. 1 depicts an exemplary vehicle front suspension 10 including a front lower control arm 12 rotatably coupled to a cradle 14. A steering knuckle 16 is pivotally coupled to front lower control arm 12. A wheel (not shown) may be rotatably coupled to knuckle 16 to provide a steerable configuration. A first bushing 18 is fixed to a socket 20 formed within front lower control arm 12. A mount 22 rotatably interconnects a forward arm 24 of front lower control arm 12 with cradle 14. Another bushing 26 is coupled to front lower control arm 12 to rotatably couple knuckle 16 to front lower control arm 12.

Figure 2:
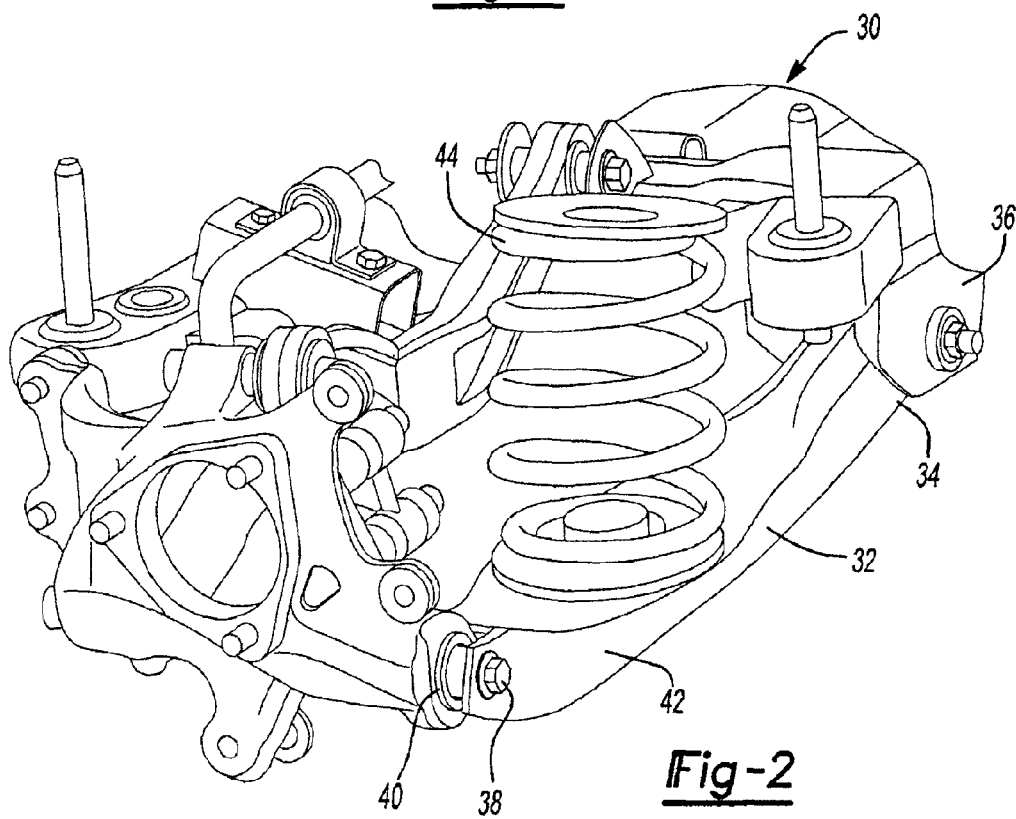
FIG. 2 is a fragmentary perspective view depicting a rear lower control arm within a vehicle rear suspension.

An exemplary vehicle rear suspension 30 is depicted in FIG. 2. Rear suspension 30 includes a rear lower control arm 32 having a first end 34 pivotally coupled to a frame 36. A second end 38 of rear lower control arm 32 is pivotally coupled to a spider 40. Spider 40 is coupled to other frame and suspension members and is operable to mount a wheel for rotation thereon. A spring seat 42 is formed within rear lower control arm 32 and is adapted to receive one end of a coil spring 44.

Figure 3:
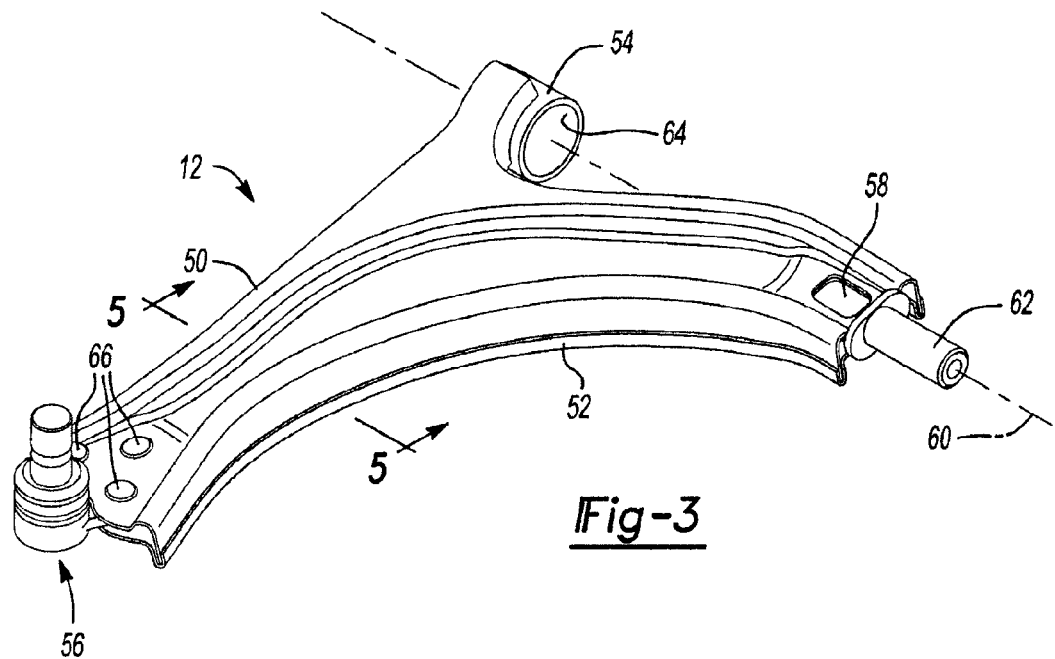
FIG. 3 is a perspective view of a front lower control arm assembly.
Figure 4:
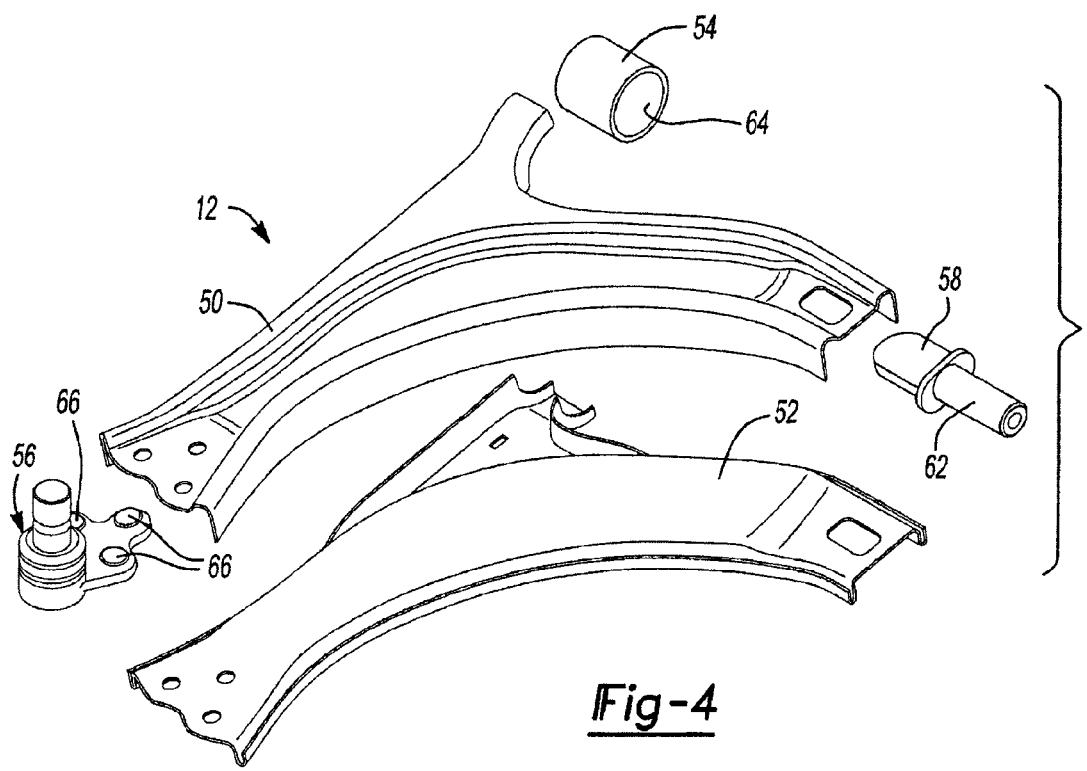
FIG. 4 is an exploded perspective view of the front lower control arm depicted in FIG. 3.
Figure 6:
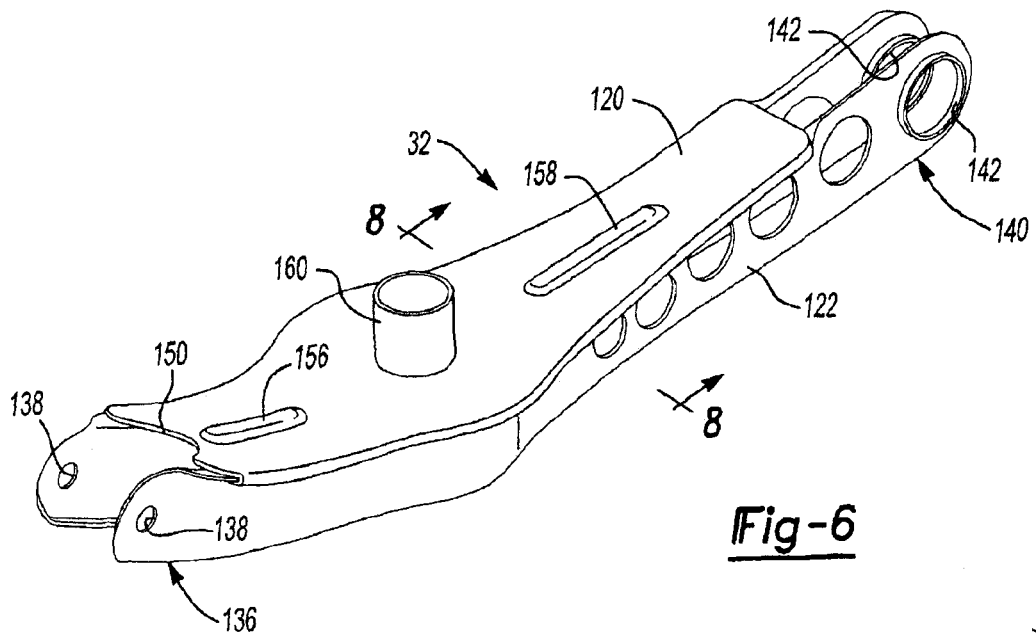
FIG. 6 is a perspective view of a rear lower control arm.
Figure 7:
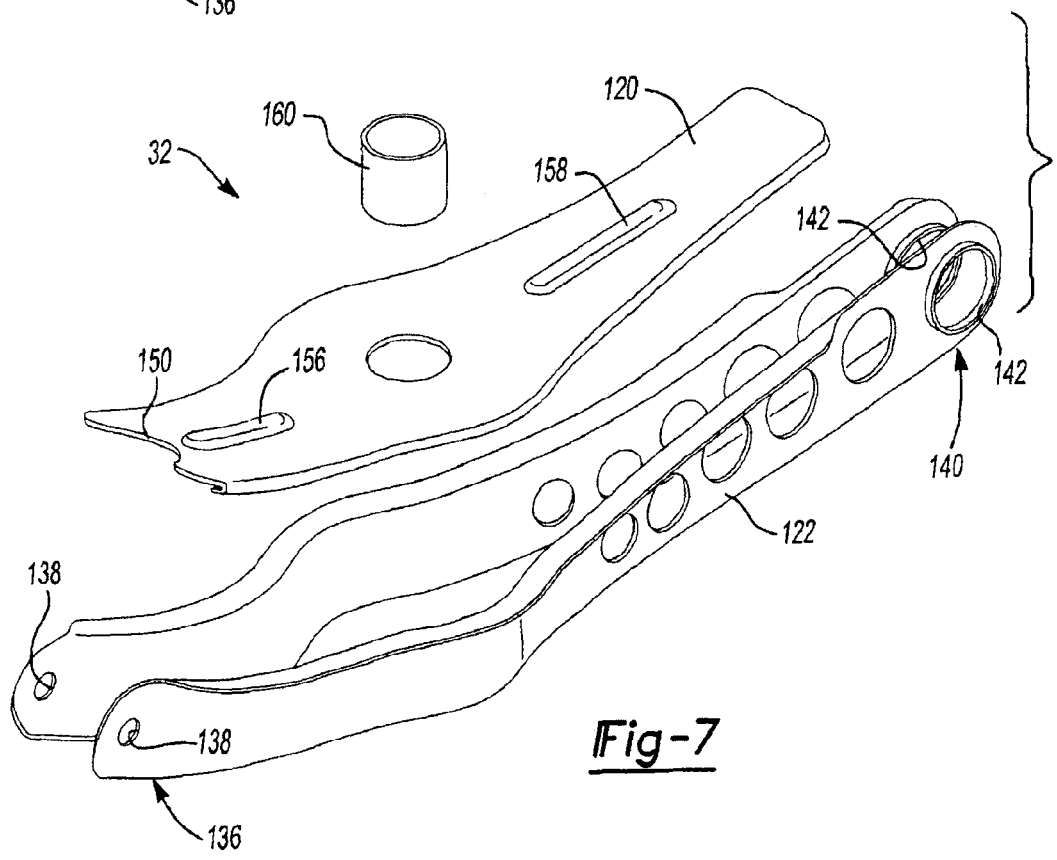
FIG. 7 is an exploded perspective view of the rear lower control arm depicted in FIG. 6.

As shown in FIGS. 3-5, front lower control arm 12 includes a first or upper sheet 50, a second or lower sheet 52, a bushing sleeve 54, a ball joint assembly 56 and a pivot pin 58. In lieu of pivot pin 58, another bushing sleeve may be used. Upper sheet 50 and lower sheet 52 are preferably stampings constructed from a metal such as steel or aluminum. Upper sheet 50 may be formed from a different material than lower sheet 52. The sheets may have different thicknesses from one another and the thickness of a single sheet may vary.

Bushing sleeve 54 and pivot pin 58 are fixed to upper sheet 50 and lower sheet 52 such that an axis of rotation 60 is defined by an outer surface 62 of pin 58 and an inner cylindrical surface 64 of bushing sleeve 54. Bushing sleeve 54 and pin 58 may be adhesively bonded to sheets 50, 52. Other mechanical joining methods may be used as well. Ball joint assembly 56 is mechanically fastened to another portion of front lower control arm 12 by mechanical fasteners 66. Mechanical fasteners 66 may be formed as rivets, pins, threaded fasteners or the like. Ball joint assembly 56 may be attached by other methods including a press fit, CD weld or the like. Ball joint assembly 56 may be coupled to both or either upper sheet 50 and lower sheet 52.

Upper sheet 50 includes a substantially planar center portion 70 bounded by a first channel portion 72 and a second channel portion 74. First channel portion 72 includes a first inner wall 76 and a first outer wall 78 interconnected by a first top wall 80. First inner wall 76 and first outer wall 78 are spaced apart from and extend substantially parallel to one another. First outer wall 78 includes a first terminal end face 82 extending beyond a plane defined by a lower surface 84 of center portion 70.

In similar fashion, second channel portion 74 includes a second inner wall 88 and a second outer wall 90 interconnected by a second top wall 92. Second inner wall 88 extends substantially parallel to and spaced apart from second outer wall 90. Second outer wall 90 includes a second terminal end face 94 that also extends below the plane defined by surface 84.

Lower sheet 52 includes a substantially planar center portion 98 bounded on either side by a first rib 100 and a second rib 102. First rib 100 includes an inner wall 104 and an outer wall 106. Inner wall 104 and outer wall 106 extend substantially parallel to one another and are spaced apart by a distance substantially equal to the thickness of first outer wall 78 to define a first pocket 107. Second rib 102 includes an inner wall 108 extending substantially parallel to and spaced apart from an outer wall 110. Inner wall 108 and outer wall 110 are spaced apart to define a second pocket 112 having a width substantially equal to the thickness of second outer wall 90.

Upper sheet 50 is nested with lower sheet 52 by positioning first terminal end face 82 and second terminal end face 94 within the pockets 107, 112 defined by lower sheet 52. Upper sheet 50 is positioned to engage surface 84 of center portion 70 with a substantially planar surface 114 formed on center portion 98 of lower sheet 52. It should be appreciated that outer walls 106, 110 are upturned portions of lower sheet 52 that may be formed during a hemming operation after surface 84 has been placed into engagement with surface 114. Prior to hemming, the material used to form outer walls 106, 110 extends along the same planes as inner walls 104 and 108, respectively. During the hemming operation, the outer walls 106, 110 are formed by rotating these portions 180°. A compressive load may be applied across inner wall 104 and outer wall 106 as well as across inner wall 108 and outer wall 110 to mechanically and frictionally engage the surfaces of first outer wall 78 and second outer wall 90 with lower sheet 52. In an optional additional process step, a structural adhesive may be applied to the joint prior to hemming to further secure upper sheet 50 to lower sheet 52.

Rear lower control arm 32 includes an upper stamping 120 coupled to a lower stamping 122. Lower stamping 122 includes a U-shaped channel defined by a first wall 124, a second wall 126 and an end wall 128 interconnecting walls 124, 126. A rib 130 is formed within end wall 128 to increase its bending stiffness. A first flange 132 outwardly extends from first wall 124. A second flange 134 outwardly extends from second wall 126 in the opposite direction as that of first flange 132. A first end 136 of lower stamping 122 includes a pair of apertures 138 to pivotally mount spider 40 thereto. A second opposite end 140 of lower stamping 122 includes a pair of extruded journals 142 to pivotally mount rear lower control arm 32 to vehicle frame 36.

Upper stamping 120 includes a curved center portion 150, a first hem 152 and a second hem 154. A first stiffening rib 156 and a second stiffening rib 158 are formed in curved center portion 150 to increase the bending stiffness of rear lower control arm 32. A spring mount 160 may be coupled to upper stamping 120. To assemble rear lower control arm 32, a lower surface 164 of upper stamping 120 is placed into engagement with upper surfaces 166, 168 of first flange 132 and second flange 134, respectively. Once upper stamping 120 has been properly positioned relative to lower stamping 122, hemmed portions 152 and 154 are formed trapping first flange 132 and second flange 134 therebetween. A structural adhesive may be positioned at locations of engagement between upper stamping 120 and lower stamping 122 to increase the structural integrity of rear lower control arm 32.

Figure 9:
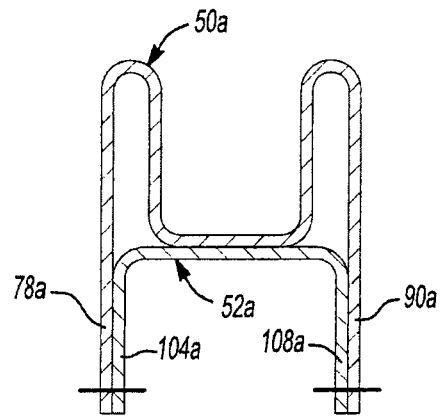
FIGS. 9-12 are cross-sectional views of alternate front lower control arms having first and second sheets coupled to one another via different interconnection methods.

FIG. 9 depicts a front lower control arm without hemmed portions. In the alternative arrangement shown in FIG. 9, a first outer wall 78a is laser welded to an inner wall 104a. An inner wall 108a of a lower sheet 52a is laser welded to a second outer wall 90a.

Figure 10:
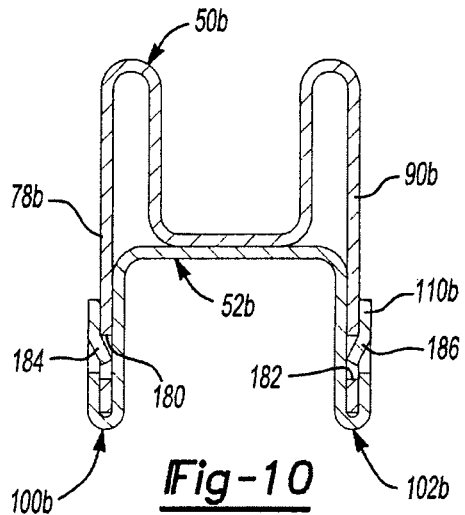

FIG. 10 depicts a mechanical interlocking arrangement between an upper sheet 50b and a lower sheet 52b. An aperture 180 may be formed in a first outer wall 78b. A similar aperture 182 is formed in a second outer wall 90b. A tab 184 is mechanically deformed to enter aperture 180 and lock upper sheet 50b to lower sheet 52b. A tab 186 is integrally formed with outer wall 110b and mechanically deformed to enter aperture 182. A plurality of additional apertures similar to apertures 180 and 182 may be spaced apart from one another along the length of ribs 100b, 102b. Additional corresponding tabs may be positioned within the additional apertures. A structural adhesive may be used to increase structural stiffness.

Figure 11:
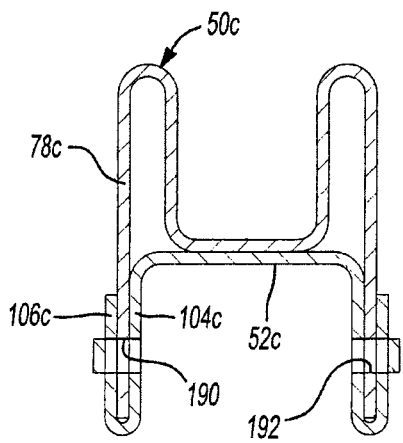

FIG. 11 depicts another arrangement where a mechanical interconnection between an upper sheet 50c and a lower sheet 52c includes a locking portion 190 of an inner wall 104c being driven through a first outer wall 78c and into an outer wall 106c. A similar mechanical deformation process is applied on the opposite side to form another locking portion 192. A structural adhesive may be used to increase structural stiffness.

Figure 12:
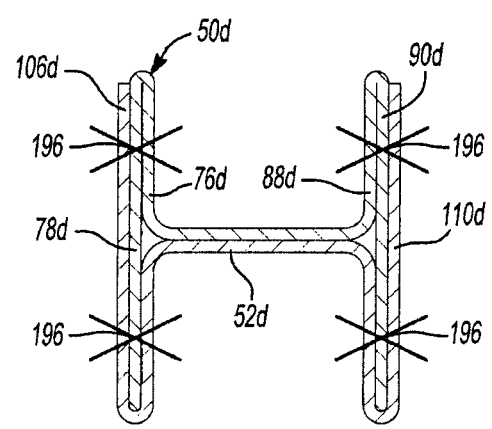

FIG. 12 depicts another alternate arrangement where an upper sheet 50d is fixed to a lower sheet 52d. Lower sheet 52d includes outer walls 106d and 110d that extend substantially the entire length of outer walls 78d and 90d.

It should be noted that upper sheet 50d includes a first inner wall 76d and first outer wall 78d. However, a channel portion including top wall 80 no longer exists. Inner wall 76d engages outer wall 78d as they are no longer spaced apart from one another. A similar configuration exists on the opposite side of upper sheet 50d including an inner wall 88d being positioned in engagement with outer wall 90d. Spot welds 196 are formed at multiple locations along the "H" shaped cross-section. Each spot weld 196 extends through a triple thickness of material to interconnect upper sheet 50d with lower sheet 52d. By using the triple thickness configuration, the gauge of material used to define upper sheet 50d and lower sheet 52d may be reduced in comparison to the arrangements previously shown.

Figure 13:
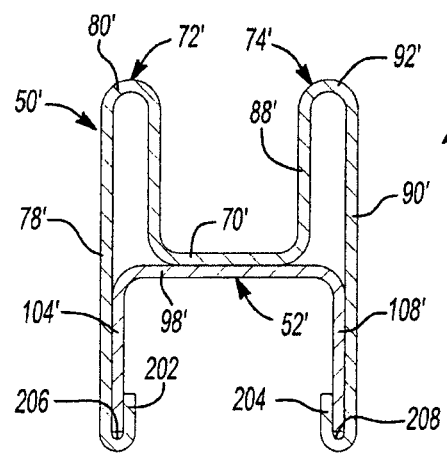
FIG. 13 is a cross-sectional view of another alternate suspension component.

FIG. 13 depicts a cross-section of another suspension component identified at reference numeral 200. Suspension component 200 is substantially similar to front lower control arm 12. Accordingly, like elements will be identified with reference numerals including a prime suffix. Suspension component 200 differs from front lower control arm 12 in that terminal portions 202, 204 of first outer wall 78' and second outer wall 90' are wrapped around inner walls 104' and 108' of lower sheet 52' to form hemmed flanges 202, 204. Accordingly, a first pocket 206 is formed between first outer wall 78' and hemmed flange 202. In similar fashion, a second pocket 208 is formed between hemmed flange 204 and second outer wall 90'.

In an optional process step, a structural adhesive may be positioned within one or more of the hemmed joints. It should be appreciated that any of the alternate interconnection methods depicted in FIGS. 9-12 may be used to couple upper sheet 50' and lower sheet 52' as well. Furthermore, it is within the scope of the present disclosure to reverse the hemming arrangement previously described in relation to rear lower control arm 32. In particular, a hemmed flange of the lower sheet may be wrapped around exterior edges of an upper sheet. The alternate interconnection methods between sheets defining a front lower control arm also apply to rear lower control arms as well as other suspension components not explicitly depicted in the Figures.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A vehicle suspension component, comprising:
   a first metal sheet including a substantially planar center portion bounded by a first channel portion having a first outer wall and a second channel portion having a second outer wall; and
   a second metal sheet including a center portion in engagement with the center portion of the first sheet, the second sheet including a first downturned wall engaging a surface of the first outer wall as well as a second downturned wall engaging a surface of the second outer wall, one of the first and second sheets including a first hemmed flange portion wrapping around a first edge of the other of the first and second sheets and engaging another surface of the other first and second sheet, one of the first and second sheets including a second hemmed flange portion wrapping around a second edge of the other of the first and second sheets and engaging another surface of the first and second sheets.

2. The vehicle suspension component of claim 1 wherein the first metal sheet includes a first inner wall extending substantially perpendicular to the center portion of the first sheet, the first outer wall extending substantially parallel to the first inner wall.

3. The vehicle suspension component of claim 2, wherein an end wall interconnects the first inner wall and the first outer wall, the end wall extending substantially parallel to the center portion of the first sheet.

4. The vehicle suspension component of claim 3, wherein the first outer wall extends beyond a contact plane between the center portions of the first sheet and the second sheet.

5. The vehicle suspension component of claim 1 further including a structural adhesive contacting the first hemmed flange.

6. The vehicle suspension component of claim 1 further including first, second and third spaced apart joint members coupled to one of the first and second sheets to allow pivoting of the suspension component.

7. The vehicle suspension component of claim 6, wherein the first and second joint members are aligned along a common axis of suspension component rotation.

8. The vehicle suspension component of claim 1, wherein the first and second sheets form a closed hollow cross section.

\* \* \* \* \*